US007663527B2

United States Patent
Van Der Veen et al.

(10) Patent No.: US 7,663,527 B2
(45) Date of Patent: Feb. 16, 2010

(54) METHOD OF REDUCING QUANTIZATION NOISE

(75) Inventors: Minne Van Der Veen, Eindhoven (NL); Aweke Negash Lemma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 311 days.

(21) Appl. No.: 11/577,368

(22) PCT Filed: Oct. 14, 2005

(86) PCT No.: PCT/IB2005/053378

§ 371 (c)(1),
(2), (4) Date: Apr. 17, 2007

(87) PCT Pub. No.: WO2006/043218

PCT Pub. Date: Apr. 27, 2006

(65) Prior Publication Data

US 2009/0046819 A1   Feb. 19, 2009

(30) Foreign Application Priority Data

Oct. 20, 2004   (EP)   .................... 04105181

(51) Int. Cl.
*H04N 7/26*   (2006.01)
(52) U.S. Cl. ........................ 341/200; 380/200
(58) Field of Classification Search ................. 341/200; 380/200; 713/176; 382/100; 370/375
See application file for complete search history.

(56) References Cited

U.S. PATENT DOCUMENTS

2006/0080581 A1*   4/2006   Ono ........................... 714/704

FOREIGN PATENT DOCUMENTS

| DE | 19947877 A1 | 10/2001 |
|---|---|---|
| EP | 0612159 A2 | 8/1994 |
| EP | 1359762 A1 | 11/2003 |
| WO | WO2005071974 A2 | 8/2005 |

OTHER PUBLICATIONS

P. Amon et al., "ITU- Telecommunications Standardization Sector", Doc. VCEG-N35, Santa Barbara, CA, Sep. 2001—http://ftp3.itu.int/av-arch/video-site/0109-San/VCEG-N35.com.
P. Amon et al., "SNR Scalable Layered Video Coding", Siemens Corp Technology, Munich, Germany, http://amp.ece.cmu.edu/packetvideo2002/papers/59-ethpsnsons.pdf.

(Continued)

*Primary Examiner*—Rexford N Barnie
*Assistant Examiner*—Joseph Lauture

(57) ABSTRACT

There is described a system (10; 300) for processing an input signal (340) to generate a corresponding encoded output signal (380). The system (10; 300) includes a plurality of quantizing devices (30, 70; 350, 370) coupled in series, the system (10; 300) being configured in operation to reduce tandem quantization noise arising therein by:

(a) analyzing the system (10; 300) to determine signal regions (290) in which tandem noise errors occur; and
(b) modifying one or more earlier quantizing devices (30; 350) in the system (10; 300) with backward correction to reduce tandem noise arising therein from said determined signal regions (290), said one or more earlier quantizing devices (30; 350) not including a last quantizing device (70; 370) in series the system (10; 300).

15 Claims, 4 Drawing Sheets

OTHER PUBLICATIONS

Werner O: "Requantization for Transcoding of MPEG-2 Intraframes" IEEE Transactions on Image Processing, IEEE Service Center, Piscataway, NJ, US, vol. 8, No. 2, Feb. 1999, pp. 179-191.

Koch A C et al: "Analysis of Subband Quantization of Wideband Audio Codec Tandemming" Electrical and Computer Engineering, 1993. Canadian Conference on Vancouver, BC, Canada Sep. 14-17, 1993, New York, NY, USA, IEEE, Sep. 14, 1993, pp. 285-288.

* cited by examiner

METHOD OF REDUCING QUANTIZATION NOISE

The present invention relates to methods of reducing quantization noise; for example, the invention more specifically relates to methods of reducing tandem quantization noise which arises when a plurality of signal quantizing stages are coupled together in a series arrangement. Moreover, the present invention also relates to apparatus operable to implement the aforesaid methods. Furthermore, the present invention relates to quantized output data generated by executing the methods.

Tandem coding artifacts arise when quantizers are coupled in a series arrangement. Such coding artifacts are encountered when, for example, transcoding multimedia signals, wherein a dominant component of these artifacts is known as "tandem quantization noise".

In FIG. 1, there is shown a contemporary music delivery system indicated generally by 10. The system 10 comprises a data store 20 for providing pulse code modulated (PCM) programme content data x denoted by 100. Moreover, the system 10 further comprises a first quantizing encoder EN1 ($Q_1$) denoted by 30 which is operable to provide encoded data $x_{b1}$ denoted by 110. The system 10 includes an intermediate data store AAC denoted by 40 for stored data compressed according to a contemporary AAC compression standard. Additionally, the system 10 comprises a decoder DEC1 denoted by 50 for generating decoded data $x_1$ denoted by 120. The system 10 also comprises a watermark embedder WATMKEMB denoted by 60. Finally, the system 10 includes a second quantizing encoder EN2($Q_2$) denoted by 70 for generating an encoded output bitstream $x_{b2}$ denoted by 130.

In operation, the data store 20 outputs the content data x 100 to the encoder EN1(Q1) 30 which quantizes and encodes the data x 100 to generate the corresponding encoded data $x_{b1}$ 110 for storage in the intermediate data store 40. In response to a request for music from a consumer, the system 10 is operable to instruct the intermediate store AAC 40 to output corresponding store encoded data as a bit-stream to the decoder DEC1 50. The decoder DEC1 50 partially decodes the bitstream to generate the data $x_1$ 120 which is subsequently input to the watermark embedder WATMKEMB 60 which outputs corresponding watermarked content data to the second quantizing encoder EN2 ($Q_2$) 70. The encoder EN2 ($Q_2$) 70 processes the data received from the watermark embedder WATMKEMB 60 to generate the encoded output bitstream $x_{b2}$ 130 for supply to the consumer.

One drawback in aforementioned operation of the system 10 involving partial decoding of encoded data followed by subsequent re-encoding is the introduction of tandem artifacts into the output bitstream $x_{b2}$ 130. These artifacts are errors caused by cascading two or more audio compression algorithms, namely cascading the encoders 30, 70 when implemented using software. The tandem artifacts, also known as tandem error, are more easily appreciated with reference to FIG. 2 in which two graphs indicated by 200, 210 corresponding to the encoders 30, 70 respectively. The graphs 200, 210 include abscissa axes 250, 270 respectively and quantization ordinate axes 260, 280 respectively. Moreover, in this example, the encoders 30, 70 are operable to employ words lengths w1=3 bits and w2=2 bits respectively. For these example word lengths, the system 10 is operable to transcode to a lower bitrate when generating the output data $x_{b2}$ 130.

Thus, the input signal represented by data x 100 is defined as x∈[0,7] after processing in the first encoder EN1 ($Q_1$) 30 to generate the encoded data $x_{b1}$ 110. This encoded data $x_{b1}$ 110 may, for example, be directly further encoded (without watermarking) in the second encoder EN2 ($Q_2$) 70 to generate a output bitstream $y_{12}$ defined by Equation 1 (Eq. 1):

$$y_{12} = Q2(Q1(x)) \qquad \text{Eq. 1}$$

for which an associated average quantization error $e_{12}$ is given by Equation 2 (Eq. 2):

$$e_{12} = \frac{1}{N} \sum |y_{12} - x| \qquad \text{Eq. 2}$$

for N samples. In comparison, quantization error generated by processing the data x directly through the second encoder EN2 ($Q_2$) 60 wherein $y_2 = Q2(x)$ is given by Equation 3 (Eq. 3):

$$e_2 = \frac{1}{N} \sum |y_2 - x| \qquad \text{Eq. 3}$$

In general, the quantization error of $y_2$ is smaller than that of $y_{12}$, namely $e_2 < e_{12}$. Moreover, a difference between the quantization errors of $y_{12}$ and $y_2$ corresponds to the aforementioned tandem error $e_t$ according to Equation 4 (Eq. 4):

$$e_t = e_{12} - e_2 \qquad \text{Eq. 4}$$

Referring again to FIG. 2, in the system 10, tandem error is generated in cross-hatched regions of the graph 200, for example in a cross-hatched region 290, namely:

$$x \in [0.5, 1] \; x \in [2.5, 3] \; x \in [4.5, 5] \; x \in [6.5, 7]$$

For example, a signal x with amplitude 2.75 is first quantized by the first encoder EN1 ($Q_1$) to an amplitude 3, namely 3=Q1(2.75), and subsequently in the second encoder EN2 ($Q_2$) to an amplitude 4, namely 4=Q2(Q1(2.75)). The resulting quantization error is 4−2.75=1.25. In comparison, only using the second encoder EN2 ($Q_2$) results in a considerably smaller error, namely Q2(2.75)−2.75=0.75.

The increase in quantization error corresponding to tandem noise is generally recognized as a problem associated with transcoding. Apart from reducing signal-to-noise ratio of a signal, the tandem noise can also obscure more subtle signal features, for example audio watermark information included within an audio signal.

At least partial solutions to the problem of tandem noise have been proposed in the prior art. A first solution reduces tandem noise by cascading two quantizing encoders, namely a first encoder followed in sequence by a second encoder. The first encoder is arranged to employ a considerably higher bit rate relative to the second encoder. Such reduction can be appreciated from FIG. 2 wherein encoders with high bitrates corresponds to quantizers with larger word lengths and associated higher resolution, namely increasing the resolution of the encoder 30. Although this approach is effective, it has a drawback that data storage space required on the intermediate data store AAC 40 for the $x_{b1}$ 110 is increased higher than is necessary. Other approaches are known wherein modelling techniques can be used to predict tandem noise and apply this prediction to at least partially compensate to reduce the tandem noise.

In a published European patent application no. EP 1 359 762, there is described a coder/decoder system and a method of encoding and decoding input data at several different quantization levels. The different quantization levels permit signal-to-noise ratio (SNR) scalability. The system comprises several quantizer units, wherein each quantizer unit operates to quantize the input data at a corresponding quantization level. Moreover, each quantizer is operable to apply a quantizing function. In the system, for achieving optimal SNR scalability, the quantizer units are arranged in a particular processing order so that a mean square error of a prediction error is minimized and so that the quantization prediction error can be perfectly reconstructed.

Thus, the inventors are concerned with a technical problem of devising a method of reducing tandem quantization noise in cascaded quantizers.

An object of the present invention is to provide a method of reducing tandem quantization noise in cascaded quantizers or cascaded quantizing encoders.

According to a first aspect of the present invention, there is provided a method of reducing tandem quantization noise in a system comprising a plurality of quantizing devices coupled in series, the method including steps of:

(a) analyzing operation of the system to determine signal regions in which tandem noise errors occur; and
(b) modifying one or more earlier quantizing devices in the system with backward correction to reduce tandem noise arising therein from said determined signal regions, said one or more earlier quantizing devices not including a last quantizing device in series in the system.

The invention is of advantage in the method in that it is capable of reducing tandem quantization noise in cascaded quantizing configurations.

Optionally, the method comprises a further step of arranging for the system to process signals through the series of quantizing devices, said signals comprising one or more of: audio signals, video signals, image signals, text bearing signals. The method is of benefit in that it is capable of being applied to a wide range of different types of signal.

Optionally, the method includes a step of arranging for said plurality of quantizing devices to implement compression algorithms for compressing data processed by said quantizing devices. More preferably, said compression algorithms include at least one of: MPEG compression, AAC compression and MP3 compression. Such compression algorithms are capable of reducing data storage requirements.

Optionally, the method includes a further step of adding watermark data to data being processed through said plurality of quantizing devices. The method is of benefit in that it is capable of being used in conjunction with watermarking data content, wherein reduced tandem quantization noise provided by the method at least partially circumvents problems with such tandem noise obscuring subtle added watermark data.

Optionally, the method is applied in conjunction with implementing a multimedia signal distribution system. The method is then of benefit in improving quality of programme content delivered to users via such a distribution system.

Optionally, in the method, a last quantizer in the plurality of quantizing devices coupled in series is also modified to reduce tandem noise arising within the system.

According to a second aspect of the invention, there is provided quantized output data generated using a method according to the first aspect of the invention, said data being conveyable by way of a communication network and/or data carrier.

According to a third aspect of the invention, there is provided an apparatus for processing an input signal to generate a corresponding encoded output signal, said apparatus including a plurality of quantizing devices coupled in series, wherein said apparatus in operation is configured to reduce tandem quantization noise arising therein by:

(a) analyzing the apparatus to determine signal regions in which tandem noise errors occur; and
(b) modifying one or more earlier quantizing devices in the apparatus with backward correction to reduce tandem noise arising therein from said determined signal regions, said one or more earlier quantizing devices not including a last quantizing device is series in the apparatus.

According to a fourth aspect of the present invention, there is provided a system for processing an input signal to generate a corresponding encoded output signal, said system including a plurality of quantizing devices coupled in series, wherein said system in operation is configured to reduce tandem quantization noise arising therein by:

(a) analyzing the system to determine signal regions in which tandem noise errors occur; and
(b) modifying one or more earlier quantizing devices in the system with backward correction to reduce tandem noise arising therein from said determined signal regions, said one or more earlier quantizing devices not including a last quantizing device in series in the system.

Optionally, the system is operable to process signals through the series of quantizing devices, said signals comprising one or more of: audio signals, video signals, image signals, text bearing signals.

Optionally, the system is arranged such that said plurality of quantizing devices are operable to implement compression algorithms for compressing data processed by said quantizing devices. More preferably, the compression algorithms include at least one of: MPEG compression, AAC compression and MP3 compression.

Optionally, the system is operable to add watermark data to data being processed through said plurality of quantizing devices.

Optionally, the system is arranged in operation to implement a multimedia signal distribution system.

It will be appreciated that features of the invention are susceptible to being combined in any combination without departing from the scope of the invention.

Embodiments of the invention will now be described, by way of example only, with reference to the following diagrams wherein.

To reduce the problem of tandem quantization noise generated when cascading quantizing encoders in a system for distributing programme content data, said data pertaining to audio and/or video programme subject matter, the inventors have devised a so-called "tandem noise free" (TNF) quantizer. Such a quantizer is susceptible, for example, to being employed in the contemporary system 10 illustrated in FIG. 1.

Figure 2:
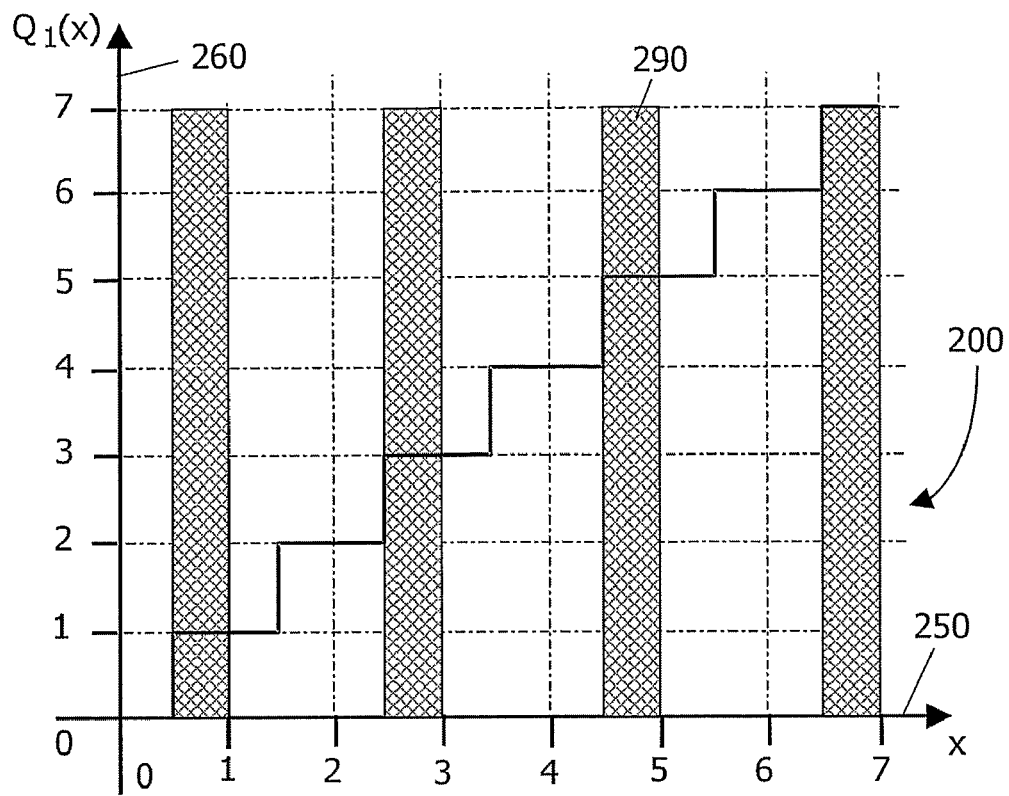
FIG. 2 is an illustration of quantizing steps of two example encoders employed in the system of FIG. 1 with zones in which tandem quantization noise is potentially generated.
Figure 2:
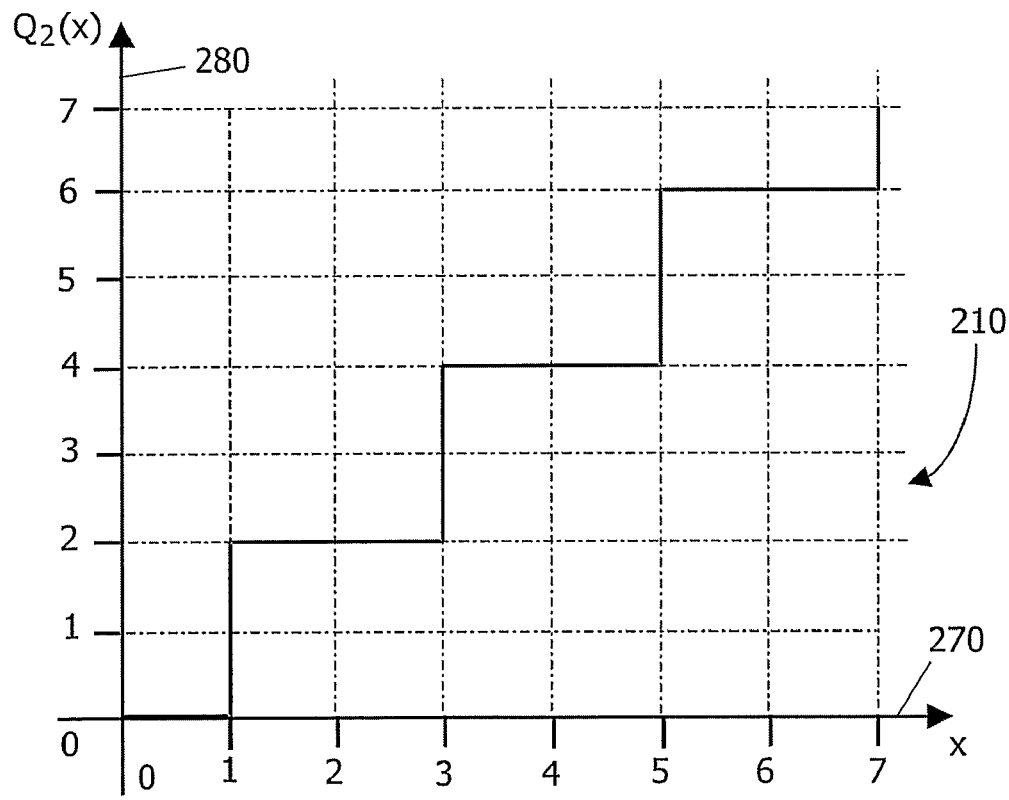
Figure 3:
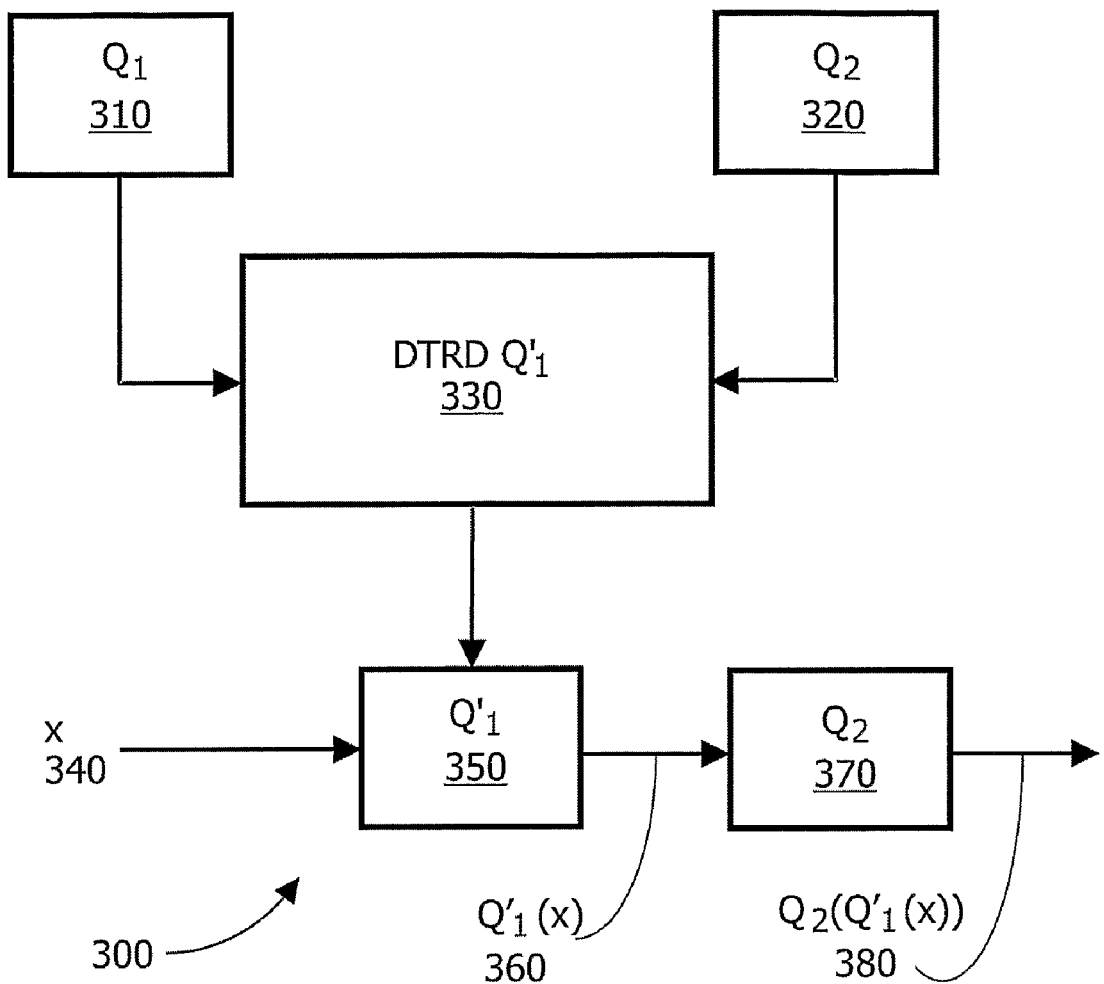
FIG. 3 is an embodiment of the present invention, namely an illustration of double quantizers which are capable of being substantially tandem noise free.

An embodiment of the invention is illustrated in FIG. 3 wherein two quantizers $Q'_1$ and $Q_2$ denoted by 350, 370 respectively are coupled in a configuration indicated generally by 300. The configuration 300 is preferably also provided with a watermark embedder (not shown) akin to the watermark embedder WATMKEMB 60 of FIG. 1. Moreover, the configuration 300 optionally also operable to implement data compression algorithms include at least one of: MPEG compression, AAC compression and MP3 compression In the configuration 300, the quantizers 350, 370 are for example part of a signal processing chain for distributing programme content data, for example akin to the system 10 illustrated in FIG. 1 adapted for multimedia purposes. Optionally, additional functions, for example data storage, are interposed between the quantizers 350, 370. The quantizers 350, 370 in the configuration 300 would be susceptible to exhibiting tandem quantization noise in a manner akin to that illustrated in FIG. 2, were it not for the first quantizer 350 being operable to quantize an input signal x denoted by 340 also in an opposite direction as will be herewith elucidated in further detail for purposes of reducing tandem quantization arising on account of operation of this first quantizer 350.

In FIG. 3, for a set of two quantizers 350, 370 with the aforementioned opposite direction operation, an output $Q_2(Q'_1(x))$ denoted by 380 is identical to the input signal x 340 processed by the second quantizer 370 as described by Equation 5 (Eq. 5):

$$Q_2(Q'_1(x)) = Q_2(x) \qquad \text{Eq. 5}$$

In other words, the overall tandem noise distortion generated by the configuration 300 in processing the signal x 340 to generate the output 380 corresponds to distortions introduced by the second quantizer 370.

To illustrate such a principle further, FIG. 2 is referred to again. The input signal x 340 is, for example, such that x=2.75. In the example contemporary system 10, this value for x 340 would be quantized to a value 4 resulting in a error of 1.25. In contradistinction to the system 10, the configuration 300 results in the output 380 assuming a value $Q'_1(2.75) = 2$ which following by the second quantizer 370 yields $Q_2(2) = 2$ for the output 380. A similar result arises if the second quantizer 370 were applied directly to process the signal x 340 to generate the output 380, namely $Q_2(2.75) = Q_2(2) = 2$. In FIG. 3, the quantizer 350 is provided with a control unit DTRD $Q'_1$ denoted by 330 for supporting the aforementioned opposite direction function associated with the first quantizer 350. "DTRD" is an abbreviation for "Derive Tandem Regions and Design $Q'_1$" indicative that conversion characteristics of the first quantizer 350 are modified in anticipation of expected tandem noise generation within the configuration 300.

In more general terms, the behavior of a set of two linear quantizers $Q_1, Q_2$ with associated output word lengths w1, w2 respectively can be analyzed. Assuming that the signal x 340 is in a range of zero as minimum and $x_{max}$ as maximum, namely $x \in [0, x_{max}]$, a quantization step $\Delta Q$ for both quantizers 350, 370 is given by Equation 6 (Eq. 6):

$$\Delta Q = (x_{max} + 1) * 2^{-w} \qquad \text{Eq. 6}$$

The number of regions, for example the region 290 in FIG. 2, denoted by $N_t$ in which tandem distortion can potentially occur is calculable from Equation 7 (Eq. 7):

$$N_t = 2^{w2} \qquad \text{Eq. 7}$$

The investors have appreciated that an average tandem error per region, namely $e_R$, is only influenced by the first quantizer 350 as provided in Equation 8 (Eq. 8):

$$e_R = \frac{\Delta Q_1}{2} \qquad \text{Eq. 8}$$

Thus, for a uniformly distributed signal x 340 such that $x \in [0, x_{max}]$, the average tandem error per signal sample processed in the configuration 300 is given by Equation 9 (Eq. 9):

$$e_t = \frac{e_R \cdot N_t}{x_{max}} * e_R = \frac{(x_{max} + 1)^2}{x_{max}} * 2^{(w2 - 2w1 - 2)} \qquad \text{Eq. 9}$$

wherein w2<w1.

Figure 4:
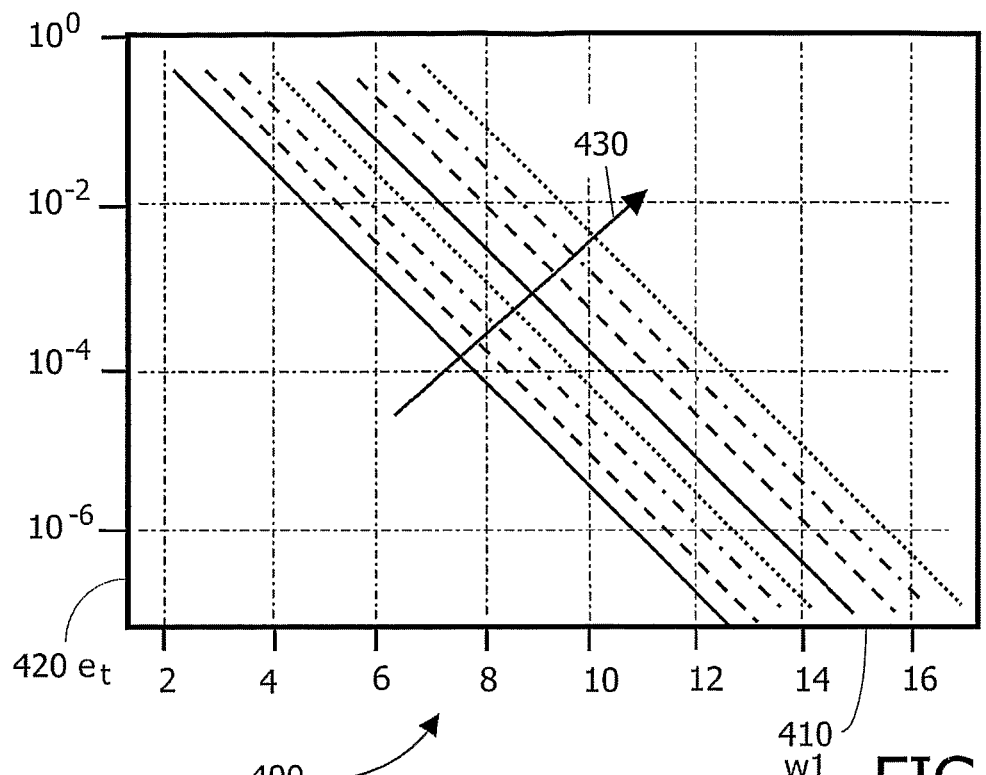
FIG. 4 is a graph illustrating a trade-off between a first quantizing encoder word length (w1) against tandem noise ($e_t$) for the embodiment of FIG. 3.

For example, in a situation wherein w1=3, w2=2 and $x_{max} = 7$, an average tandem noise error of $e_t = \frac{1}{7}$ occurs per input sample for signal x 340. The average tandem error $e_t$ is presented in a graph indicated by 400 in FIG. 4. The graph 400 includes an abscissa axis 410 denoting word length w1 and an ordinate axis 420 denoting the aforesaid average error $e_t$. An arrow 430 indicates a trend for the average error $e_t$ as the wordlength w2 is increased from 1 to 8.

The inventors have appreciated that the tandem noise error is beneficially estimated by investigating the tandem noise error relative to total quantization error in the configuration 300. When the first quantizer 350 is controlled as described in the foregoing to exhibit minimal tandem noise, the total quantization noise arising in the configuration 300 can be assumed to arise from the second quantizer 370. In such a situation, an average error $e_{q2}$ per input value in the signal x 340 is given by Equation 10 (Eq. 10):

$$e_{q2} = \frac{\Delta Q_2}{4} = (x_{max} + 1) * 2^{-(w2+2)} \qquad \text{Eq. 10}$$

Figure 5:
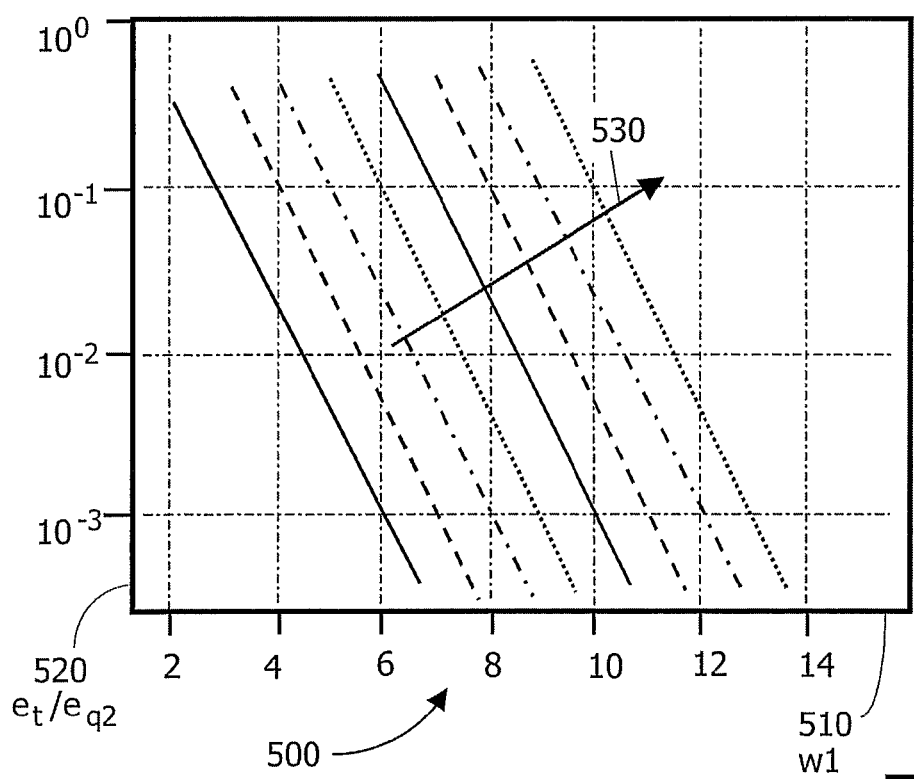
FIG. 5 is a graph illustrating a trade-off between the first quantizing encoder word length (w1) against a ratio $e_t/e_{q2}$ wherein $e_{q2}$ is quantization noise of a second quantizing encoder.

In FIG. 5, a plot of total error $e_t$ and the error $e_{q2}$ is presented on a graph indicated generally by 500. The graph 500 includes an abscissa axis 510 denoting word length of the first quantizer 350 and an ordinate axis 520 denoting a ratio of the aforesaid errors $e_t, e_{q2}$. From FIG. 2, the inventors have identified that relative energy of the quantization noise is a function of a difference in the word lengths w1, w2 of the first and second quantizers 350, 370 respectively as depicted by an arrow 530. In particular, for a given constant β, the tandem energy $e_t$ relative to the quantization noise $e_{q2}$ is given by Equation 11 (Eq. 11):

$$\frac{e_t}{e_{q2}} = \beta * 2^{-2(w1-w2)} \qquad \text{Eq. 11}$$

From Equations 9 and 10, the constant β is found to have a numerical value of β=2. The relative energy discernible from the ordinate axis 520 increase as the word length w2 approaches w1. For example, when w2=w1−1, the tandem noise $e_t$ is about 50% of the quantization noise $e_{q2}$. As a further example, w2=w1−2, the tandem noise $e_t$ is about 12.5% of the quantization noise $e_{q2}$.

Figure 1:
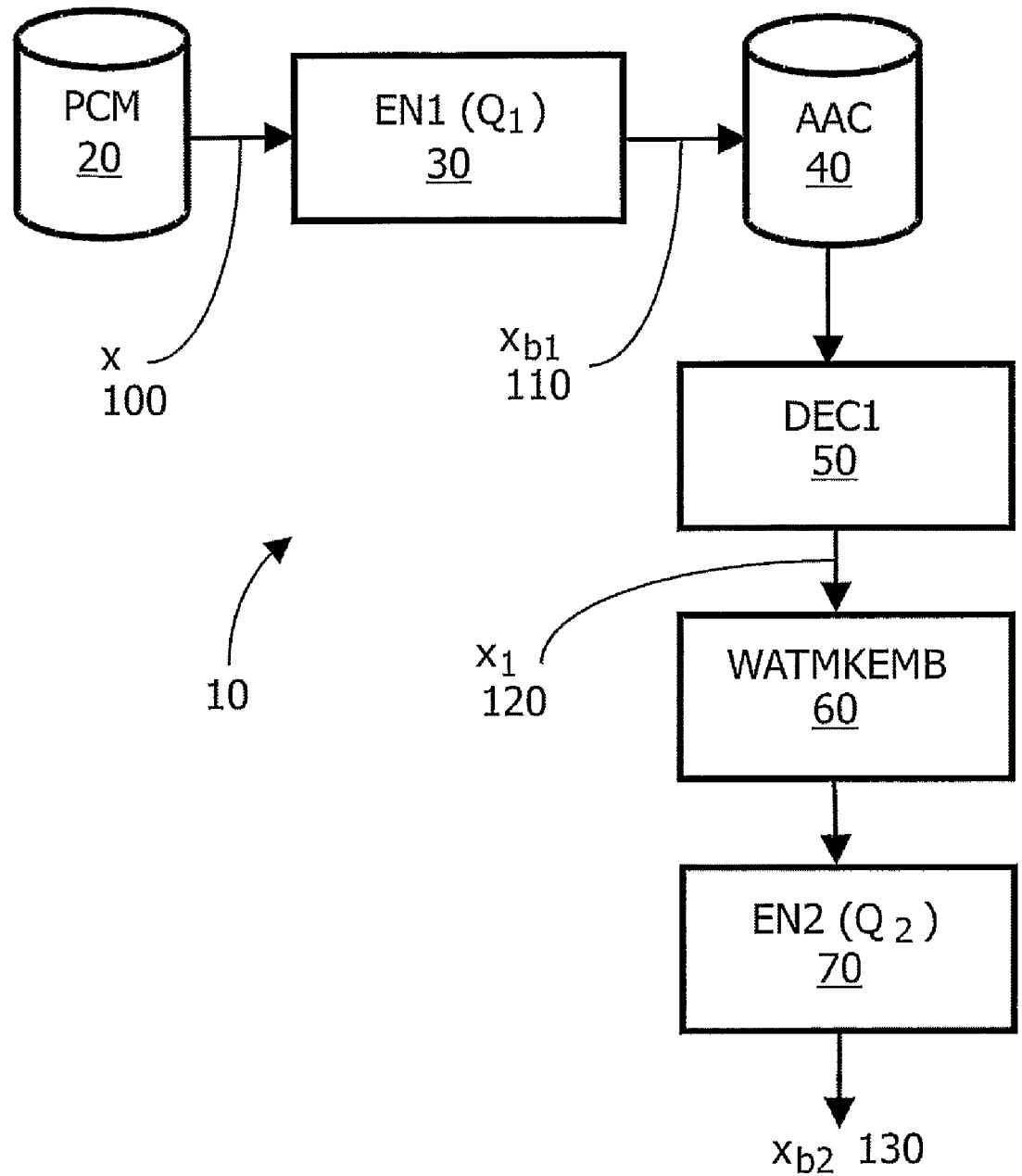
FIG. 1 is a schematic diagram of a known programme content distribution system employing cascaded quantizing encoders, wherein the encoders are prone to exhibiting tandem quantization noise in operation.

The configuration 300 illustrated in FIG. 3 is susceptible to being used in the system 10 shown in FIG. 1. In the system 10 modified according to the present invention, an audio signal is transcoded within the system 10 from 128 kbytes per second to 64 kbytes per second. For example, in the case of a 44.1 kHz signal, such transcoding corresponds to a transcoding from 3 bits/sample to 1.5 bits/sample. If linear quantizers are employed for the quantizing encoders 30, 70, the relative tandem noise energy becomes 25% of the total quantization noise $e_t$. Thus, the total coding noise arising in the system 10 can be reduced by 25%.

From the foregoing, it will be appreciated that the system 10 is susceptible to being adapted according to the present invention so that tandem noise is substantially not introduced despite there being two cascaded quantizing encoders 30, 70, thereby improving quality of the output $x_{b2}$ 130. Alternatively, for a given audio quality, the invention is capable of reducing storage space required in the data store AAC 40 for storing the encoded bitstream $x_{b1}$ 110.

It will be appreciated that embodiments of the invention described in the foregoing are susceptible to being modified without departing from the scope of the invention as defined by the accompanying claims.

In the accompanying claims, numerals and other symbols included within brackets are included to assist understanding of the claims and are not intended to limit the scope of the claims in any way.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

The invention claimed is:

1. A method of reducing tandem quantization noise in a system comprising a plurality of quantizing devices coupled in series, the method including steps of:
   (a) analyzing operation of the system to determine signal regions in which tandem quantization noise errors occur; and
   (b) modifying one or more earlier quantizing devices in the system with backward correction to reduce tandem quantization noise arising therein from said determined signal regions, said one or more earlier quantizing devices not including a last quantizing device in series in the system.

2. A method as claimed in claim 1, said method comprising a further step of arranging for the system to process signals through the series of quantizing devices, said signals comprising one or more of: audio signals, video signals, image signals, text bearing signals.

3. A method as claimed in claim 1, said method including a step of arranging for said plurality of quantizing devices to implement compression algorithms for compressing data processed by said quantizing devices.

4. A method as claimed in claim 3, wherein said compression algorithms include at least one of: MPEG compression, AAC compression and MP3 compression.

5. A method as claimed in claim 1, said method including a further step of adding watermark data to data being processed through said plurality of quantizing devices.

6. A method as claimed in claim 1, said method applied in conjunction with implementing a multimedia signal distribution system.

7. A method as claimed in claim 1, wherein a last quantizer in the plurality of quantizing devices coupled in series is also modified to reduce tandem quantization noise arising within the system.

8. Quantized output data generated using a method as claimed in claim 1, said data being conveyable by way of a communication network and/or data carrier.

9. An apparatus for processing an input signal to generate a corresponding encoded output signal, said apparatus including a plurality of quantizing devices coupled in series, wherein said apparatus in operation is configured to reduce tandem quantization noise arising therein by:
   (a) analyzing the apparatus to determine signal regions in which tandem quantization noise errors occur; and
   (b) modifying one or more earlier quantizing devices in the apparatus with backward correction to reduce tandem quantization noise arising therein from said determined signal regions, said one or more earlier quantizing devices not including a last quantizing device is series in the apparatus.

10. A system for processing an input signal to generate a corresponding encoded output signal, said system including a plurality of quantizing devices coupled in series, wherein said system in operation is configured to reduce tandem quantization noise arising therein by:
   (a) analyzing the system to determine signal regions in which tandem quantization noise errors occur; and
   (b) modifying one or more earlier quantizing devices in the system with backward correction to reduce tandem quantization noise arising therein from said determined signal regions, said one or more earlier quantizing devices not including a last quantizing device in series in the system.

11. A system as claimed in claim 10, wherein said system is operable to process signals through the series of quantizing devices, said signals comprising one or more of: audio signals, video signals, image signals, text bearing signals.

12. A system as claimed in claim 10, said system being arranged such that said plurality of quantizing devices are operable to implement compression algorithms for compressing data processed by said quantizing devices.

13. A system as claimed in claim 12, wherein said compression algorithms include at least one of: MPEG compression, AAC compression and MP3 compression.

14. A system as claimed in claim 10, said system being operable to add watermark data to data being processed through said plurality of quantizing devices.

15. A system as claimed in claim 10, said system being arranged in operation to implement a multimedia signal distribution system.

* * * * *